United States Patent Office 2,828,286
Patented Mar. 25, 1958

2,828,286

POLYMERIZATION OF FORMALDEHYDE

Robert Neal MacDonald, Wilmington, Del., assignor to E. I. du Pont de Nemours and Company, Wilmington, Del., a corporation of Delaware No Drawing. Application June 30, 1953
Serial No. 365,235

4 Claims. (Cl. 260—67)

This invention relates to polymerization processes and specifically to the polymerization of formaldehyde into high polymers, as distinguished from low polymers such as paraformaldehyde or trioxane.

This is a continuation-in-part of copending application Serial No. 307,361, filed by R. N. MacDonald on August 30, 1952, and now abandoned.

It is known that formaldehyde polymerizes at low temperatures in solvents in the presence of such catalysts as sulfuric acid, boron trichloride and trimethylamine to brittle, unstable polymers.

It is an object of this invention to produce superior, tough, stable polymers of formaldehyde by utilizing a new class of catalysts having the general formula

in which M is an element of atomic number 15 through 51 from sub-group B, group 5, of the periodic table and R, R', and R" are monovalent hydrocarbon radicals. Other objects will appear in the detailed description of the invention given hereinafter.

The above objects are accomplished by contacting anhydrous, monomeric formaldehyde with the above described catalyst to produce a tough, stable, high polymer of formaldehyde.

In one practical and preferred method of operation, anhydrous monomeric formaldehyde is continuously introduced into an inert organic liquor contained in a reactor, which has been purged of oxygen by sweeping with an inert gas, provided with a thermometer, agitator and means for adding the catalyst. While the agitator is in operation, the catalyst, dissolved in a solvent which is preferably identical with the organic compound forming the reaction medium, is added at such a rate that the temperature is maintained within the range selected for operation. A convenient and preferred range is from —120° C. to 70° C. When the polymerization is complete, the reaction mixture is filtered and the polymer dried, suitably at ordinary temperatures.

The examples which follow are submitted to illustrate and not to limit this invention. The concentrations of catalysts, given as mole per cent, are calculated on the basis of moles of monomeric formaldehyde theoretically obtainable from the amount of alpha-polyoxymethylene pyrolyzed.

Example I.—A solution of monomeric formaldehyde (obtained by pyrolyzing 100 grams of alpha-polyoxymethylene as described subsequently) in 800 ml. of dimethyl ether was stirred at —101° to —105° C., as 0.02 mole percent (based on the formaldehyde monomer) of triphenylphosphine dissolved in 40 ml. of diethyl ether was added gradually over a period of 30 minutes. After the system had been stirred for an additional 70 minutes, the slurry which separated was filtered, and the product on the filter was washed with two-650 ml. portions of diethyl ether, one portion having been previously cooled in a solid carbon dioxide/acetone bath and the other being at room temperature. The washed product was air-dried and then further dried under vacuum. There was obtained 60 grams of snow-white, granular polymeric formaldehyde which yielded tough, stiff, translucent films at 190°–200° C. and 2000 p. s. i. pressure.

The monomeric formaldehyde was prepared as follows:

Alpha-polyoxymethylene, prepared as described subsequently, was placed in a flask connected through a battery of twelve U-tubes, maintained at —40° C., to a flask fitted with a stirrer and containing a solvent cooled generally to —80° C. The alpha-polyoxymethylene was heated to between 150° and 300° C. under a pressure of 100 and 125 mm., decomposing at these conditions to form formaldehyde. The vaporized formaldehyde was passed through the battery of U-tubes to separate impurities, following which, the formaldehyde was collected in the solvent. After pyrolysis was complete, the nitrogen was admitted into the system, the receiving flask was disconnected, and the solution filtered into a nitrogen-blanketed flask.

The alpha-polyoxymethylene pyrolyzed to produce the monomeric formaldehyde was prepared as follows:

One kilogram of 33% aqueous sodium hydroxide solution (1 mole percent, based on formaldehyde) was added, slowly, over a period of 2 hours to 84.4 kilograms of 39.8% methanol-free aqueous formaldehyde in an open stainless steel kettle. Throughout the addition, the formaldehyde was vigorously agitated and the temperature of the reaction mixture controlled at 40° C. Stirring of the reaction mixture was continued overnight. The material which separated was washed with water on a pressure filter until the filtrate was neutral, and thereafter washed with methanol. The powdery, white solid obtained was dried in a vacuum oven at 40° C. for two days and then pressed into half-inch pellets. The yield was 13.6 kilograms. The product analyzed 39.98, 39.88% carbon, 6.71, 6.86% hydrogen, water content (Fischer reagent) 0.76, 0.73. The calculated carbon and hydrogen contents for $(CH_2O)_x$ are 39.99% and 6.71%.

Example II.—A solution consisting of 1200 ml. of methylene chloride containing monomeric formaldehyde generated by the pyrolysis of 100 grams of alpha-polyoxymethylene, as described in Example I, was placed in a reactor under a nitrogen blanket and cooled to —75° C. in a solid carbon dioxide/acetone bath. As the solution was stirred at this temperature, there was added, over a period of 40 minutes, 0.02 mole percent of triphenylphosphine (based on the formaldehyde monomer) in 30 ml. of methylene chloride. Stirring was continued for an additional 30 minutes after completion of the addition of the triphenylphosphine. The precipitate which formed was removed by filtration, washed with ether, dried in air and then in vacuum. There was obtained 47 grams of a snow-white granular polymeric formaldehyde which yielded tough, stiff films at 190° C. under 2000 p. s. i. pressure.

Example III.—Monomeric formaldehyde, obtained by pyrolyzing 35 grams of alpha-polyoxymethylene (Example I), was condensed into 600 ml. of toluene at —80° C. and the solution filtered at that temperature. To the filtered solution, maintained at —80° C., there was added triphenylstibine (0.03 mol percent based on the formaldehyde monomer) in 10 ml. of toluene and the solution stirred by swirling the reactor. A thick slurry formed immediately. A stirrer was then inserted and stirring of the reaction mixture was continued for 30 minutes at solid carbon dioxide/acetone temperature (—80° C.). The precipitate which formed was removed by filtration, air dried, and then vacuum dried over anhydrous calcium sulfate. There was obtained 10.5 grams of snow-white granular polymeric formaldehyde which gave very tough, stiff, translucent films when pressed at 190–200° C. under 2000 p. s. i. pressure.

*Example IV.*—Monomeric formaldehyde, obtained by the pyrolysis of 100 grams of alpha-polyoxymethylene (Example I), was condensed into 600 ml. of toluene which had been previously purified by cooling to −80° C. and filtering to remove material which had frozen out at this temperature. The formaldehyde solution was stirred under nitrogen at −75° to −70° C. as triphenylphosphine (0.019 mole percent based on the formaldehyde monomer) in 24 ml. of toluene was added gradually over a period of 35 minutes. After 20 minutes of additional stirring of the system of the above temperature, the product was removed as a gel, which was washed on a Buchner funnel with toluene and then air- and vacuum-dried. There was obtained 79.5 grams of fibrous white polymeric formaldehyde which gave tough, stiff films by pressing at 210–240° C. under 2000 p. s. i. pressure.

*Example V.*—Monomeric formaldehyde, obtained by the pyrolysis of 100 grams of alpha-polyoxymethylene (Example I), was collected in 600 ml. of anhydrous ether. The solution was stirred under nitrogen at −75° C. and phenyldimethylphosphine (0.024 mole percent based on the formaldehyde monomer) in 40 ml. of ether was added gradually over a period of 25 minutes. Polymerization started at once as evidenced by gel particles splashing against the walls of the flask. After an additional 30 minutes' stirring of the system at −75° C., the product was filtered, washed on a Buchner funnel with ether, and finally air- and vacuum-dried. There was obtained 38 grams of snow-white polymeric formaldehyde which gave a tough, stiff film when pressed at 190° C. under 1000 p. s. i. pressure.

*Example VI.*—To a solution of 25 grams of monomeric formaldehyde (obtained as shown in Example I) in 40 ml. of ether, cooled at −84° C., was added 1 drop of triethylphosphine. The polymer which formed was isolated. When pressed at 190°–200° C. under 1000 p. s. i. pressure, a tough, translucent, stiff film was obtained.

*Example VII.*—Monomeric formaldehyde, obtained from the pyrolysis of 100 grams of alpha-polyoxymethylene (Example I), was condensed into 600 ml. of ether and polymerization initiated by gradual addition of triphenylphosphine (0.02 mole percent based on the formaldehyde monomer) in 30 ml. of ether at −75° C. The slurry of polymer was filtered cold on a Buchner funnel, washed with 300 ml. of ether, then air- and vacuum-dried to give 82 grams of snow-white, fibrous, polymeric formaldehyde. Tough, translucent, stiff films were formed at 190° C. under 1000 p. s. i. pressure; and smooth, homogeneous, tough bars were injection-molded at 210° C. under 19,000 p. s. i. pressure.

*Example VIII.*—Monomeric formaldehyde from the pyrolysis of 100 grams of alpha-polyoxymethylene (as shown in Example I) was condensed into 1200 ml. of ether and stirred under nitrogen at −75° C. Addition of triphenylamine (0.02 mole percent based on the formaldehyde monomer) over a 15-minute period caused no polymerization. The addition of triphenylphosphine (0.007 mole percent) in 10 ml. of ether over a 20-minute period caused immediate polymerization to occur, accompanied by a temperature surge to −64° C. A yield of 70 grams of polymeric formaldehyde was thus obtained.

In an experiment similar to the above, triphenylamine failed to initiate polymerization at −80° C. Addition of butylamine to the reaction mixture initiated polymerization slowly, with slight thickening in 5 minutes. Thereafter a few crystals of triphenylphosphine in ether was added bringing about immediate polymerization with setting up of the reaction mixture to a solid gel and with the evolution of heat.

*Example IX.*—Monomeric formaldehyde, generated by pyrolyzing 100 parts of alpha-polyoxymethylene, was passed through a series of two U-tube traps maintained at −15° C. and then conducted into a polymerization reactor containing 630 parts of n-pentane and 0.2 part of triphenylphosphine. The monomer was introduced into the reactor, maintained at 25° C., over a period of 4.5 hours, during which time a white powdery solid formed in the reactor. The product was 9 parts of a high molecular weight polymer of formaldehyde having an inherent viscosity of 1.9 measured at 60° C. as a 0.5% solution in p-chlorophenol containing 2% by weight of alpha-pinene. Tough, translucent films were molded from the product polymer at 180° C. to 220° C. and 1500 pounds ram pressure for 1 minute.

*Example X.*—Substantially anhydrous monomeric formaldehyde was passed through 3 U-tubes maintained at 0° C. and filled with inert packing material, and then into a 5 liter reactor containing the reaction medium maintained at 30° C. The reaction medium was 2 liters of benzene which had been recovered from 2.5 liters of benzene subjected to a distillation in which 500 ml. was removed as a topped portion. Incorporated into the reaction medium was 0.45 milligram (approximately 0.00006 mol percent, based on the formaldehyde monomer) of triethylphosphine dissolved in benzene. The formaldehyde monomer was continuously added to the agitated reaction medium at a rate of 2 grams per minute over a reaction time of 95 minutes. The temperature of the reaction medium was maintained at 30° C. Snow-white particles formed continuously as a dispersed phase in the reaction medium throughout the reaction time. The dispersed particles were high molecular weight polymeric formaldehyde. The product was recovered from the reaction medium by filtration, followed by washing the particles, first with cyclohexane and then with methanol. The product was dried at 60° C. in a vacuum oven to yield 68.5 grams of polymeric particles having an inherent viscosity of 1.7 measured at 60° C. as a 0.5% solution in p-chlorophenol containing 2% by weight of alpha-pinene. Tough, translucent films were molded from some of the product at 200° C. and 5000 pounds ram pressure for 1 minute.

Certain specific conditions of temperature, formaldehyde concentration, catalyst concentration, etc. have been used in the examples. It is to be understood that these are not to be construed as limitations but simply as illustrations of preferred practical embodiments.

It is critical that the polymerization be effected under substantially anhydrous conditions, i. e., no more than about 0.5% water, and preferably less than 0.1% water. A convenient way to obtain formaldehyde in an anhydrous monomeric condition is by pyrolysis of alpha-polyoxymethylene and distillation of the resulting vapors under reduced pressure at temperatures below 0° C., as illustrated in Example I; however, it is to be emphasized that any source of monomeric, anhydrous formaldehyde is useable in the process of this invention.

The polymerization is effected in an anhydrous organic medium which is inert to formaldehyde and to the catalyst, which is a non-solvent for polymeric formaldehyde at the reaction temperature, and which remains liquid under the conditions used in the polymerization. Usefully employable organic media are the ethers; such as, diethyl ether and dimethyl ether; hydrocarbons, such as, propane, butane, pentane, hexane, heptane decane, cyclohexane, decahydronaphthalene, xylene, benzene and toluene; and chlorinated hydrocarbons, such as, methylene chloride and the like. The preferred compounds are the hydrocarbons, particularly those with 3 to 10 carbon atoms in the molecule.

The amount of reaction medium can be between 1 and 1000 or more times the weight of the formaldehyde, but since the best results are obtained when the amount of medium is between 4 and 100 times the weight of the formaldehyde, such limits constitute the preferred concentration range.

The temperature of the polymerization reaction of this invention may vary from about −120° C. to the boiling point of the organic liquid employed as the reaction medium. It has been found to be economical to utilize reaction temperature closer to room temperature, that is, from about −85° C. to about 70° C., for most embodiments of this invention, and the latter range therefore constitutes the preferred temperature limits.

The best results from the standpoint of polymer yield are obtained when the polymerization is effected under non-oxidizing conditions. A convenient way for obtaining such conditions is by sweeping the reactor with an inert gas and polymerizing under a blanket of inert gas. A suitable inert gas is nitrogen, although others may be employed.

The catalysts used in the practice of this invention are those which correspond to the general formula

in which M is an element of atomic number 15 to 51 while R, R', and R" are monovalent hydrocarbon radicals such as aryl radicals and alkyl radicals, preferably containing from 1 to 18 carbon atoms. Examples of such compounds are the phosphines, the arsines, and the stibines and their aryl, alkyl, and cycloalkyl derivatives such as triphenylphosphine, tritolylphosphine, trixylylphosphine, trinaphthylarsine, tributylphosphine, triethylstibine, dimethylphenylarsine, tricyclohexylphosphine, methyldioctylstibine, dixylyethyl arsine, and the like. Other catalytic agents may be incorporated in the process of this invention along with any of those catalysts listed above.

The amount of catalyst employed in this invention may be a minute trace in some embodiments of this process, but preferably should be at least 0.00001 mole percent of the formaldehyde monomer. The use of more than 0.05 mole percent of catalyst has no apparent advantage and this therefore represents a practical upper limit of catalyst concentration. Generally the best results are obtained using from 0.00005 to 0.05 mole percent of catalyst and such limits therefore constitute the amounts employed in the preferred embodiment of this process.

Although the catalyst may be added in undissolved form, the catalyst is preferably added to the formaldehyde in solution in an inert organic solvent, which is preferably the same compound as the reaction medium in which the formaldehyde is polymerized. The rate of addition of the catalyst is controlled so that the temperature of the reaction mixture remains within the range selected for reaction. The above described catalysts may also be used in conjunction with other catalysts, such as the alkyl and aryl amines.

Although the examples have illustrated batch operation, it is to be understood that the process can be conducted advantageously as a continuous or semi-continuous operation.

The formaldehyde polymers obtained in accordance with the process of this invention are tough, opaque, white solids which are useful for conversion to funicular structures such as bristles, filaments and fibers, tapes, films, and many molded articles. Films made by the process of this invention have been tested for toughness by heating a 3–7 mil film for 7 days in a circulating oven at 105° C., and thereafter subjecting the film to a series of creasing cycles in an attempt to break the film. Each creasing cycle consisted of folding and creasing the film on itself and reversing the fold through 360° and creasing again along the same line. The films so tested withstood more than 100 creasing cycles without cracking or breaking.

I claim:

1. The process for polymerizing formaldehyde comprising contacting anhydrous monomeric formaldehyde in intimate association with an anhydrous organic medium which is chemically inert to formaldehyde, is a non-solvent for polymeric formaldehyde at the reaction temperature, and remains liquid under the polymerization conditions, with a compound having the general formula:

in which M is an element from the group consisting of phosphorus, arsenic, and antimony, and in which R, R', and R" are monovalent hydrocarbon radicals from the group consisting of alkyl and aryl hydrocarbon radicals.

2. The process for polymerizing formaldehyde comprising contacting an anhydrous solution of monomeric formaldehyde dissolved in an organic liquid which is chemically inert to formaldehyde, is a non-solvent for polymeric formaldehyde at the reaction temperature, and remains liquid under the polymerization conditions, at a temperature from −120° C. to the boiling point of said organic liquid, with a compound having the general formula:

in which M is an element from the group consisting of phosphorus, arsenic, and antimony, and in which R, R', and R" are monovalent hydrocarbon radicals from the group consisting of alkyl and aryl hydrocarbon radicals.

3. The process for polymerizing formaldehyde comprising contacting, at a tempeurature from about −85° C. to about 70° C., anhydrous monomeric formaldehyde with an anhydrous, liquid, organic hydrocarbon having 3 to 10 carbon atoms in the molecule, with a compound having the general formula:

in which M is an element from the group consisting of phosphorus, arsenic, and antimony, and in which R, R', and R" are monovalent hydrocarbon radicals from the group consisting of alkyl and aryl hydrocarbon radicals.

4. The process of claim 3 in which the hydrocarbon is aliphatic, and in which said compound is triphenylphosphine.

References Cited in the file of this patent

UNITED STATES PATENTS 2,296,249    Austin et al. _____ Sept. 22, 1942

OTHER REFERENCES

Walker: Jour. Amer. Chem. Soc., 55 2821–6 (1933). (Scientific Library.)

Walker: "Formaldehyde," pages 91–94, published by Reinhold Publishing Corp., New York, N. Y. (1944).